United States Patent
Vijaya Kumar et al.

(10) Patent No.: US 10,741,070 B1
(45) Date of Patent: Aug. 11, 2020

(54) METHOD TO PRIORITIZE TRANSMISSION OF SENSED OBJECTS FOR COOPERATIVE SENSOR SHARING

(71) Applicant: GM Global Technology Operations LLC, Detroit, MI (US)

(72) Inventors: Vivek Vijaya Kumar, Shelby Township, MI (US); Hariharan Krishnan, Troy, MI (US); Bo Yu, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/291,732

(22) Filed: Mar. 4, 2019

(51) Int. Cl.
*G08G 1/16* (2006.01)
*G08G 1/0967* (2006.01)
*G06K 9/00* (2006.01)

(52) U.S. Cl.
CPC ... *G08G 1/096791* (2013.01); *G06K 9/00805* (2013.01); *G06K 9/00818* (2013.01)

(58) Field of Classification Search
CPC ......... G08G 1/096791; G06K 9/00805; G06K 9/00791; G06K 9/00818
See application file for complete search history.

(56) References Cited

U.S. PATENT DOCUMENTS

| 10,292,136 | B2 * | 5/2019 | Rubin | H04L 67/12 |
|---|---|---|---|---|
| 2008/0119983 | A1 * | 5/2008 | Inbarajan | G07C 5/008 |
| | | | | 701/36 |
| 2018/0261020 | A1 * | 9/2018 | Petousis | G07C 5/008 |
| 2018/0295634 | A1 * | 10/2018 | Nagura | H04L 12/1403 |
| 2019/0130740 | A1 * | 5/2019 | Wakisaka | G08G 1/0969 |
| 2019/0197730 | A1 * | 6/2019 | Yasuda | G06T 7/70 |
| 2019/0331764 | A1 * | 10/2019 | Abari | G06K 9/00805 |

* cited by examiner

Primary Examiner — Hongmin Fan
(74) Attorney, Agent, or Firm — Quinn IP Law (57) ABSTRACT

A method to control a host vehicle includes: detecting, by a controller of the host vehicle, objects, wherein detecting objects includes receiving remote-object data, the remote-object data includes class data and location data, the objects include remote vehicles and remote infrastructure; assigning, by the controller, an object class to each of the detected objects based on the class data; assigning, by the controller, a priority value to each of the detected objects based on the object class of each of the detected objects; and assigning, by the controller, a transmission time interval (TTI) to the CSMs based on the priority value to modify the TTI of each of the CSMs in accordance with the assigned TTI; and transmitting the CSMs to the remote vehicles.

20 Claims, 6 Drawing Sheets

METHOD TO PRIORITIZE TRANSMISSION OF SENSED OBJECTS FOR COOPERATIVE SENSOR SHARING

INTRODUCTION

The present disclosure relates to a method and system for prioritizing transmission sensed objects in a cooperative sensing sharing network.

Vehicles may detect objects locally or remotely. That is, a host vehicle may use its own sensor to detect objects around. In addition, other vehicles may detect objects, and the host vehicle may detect objects using the sensors of the other vehicles.

SUMMARY

By employing this method, the sensed data is prioritized based on the sensed object type/class, location, and other parameters to optimize the transmission time interval (TTI) of the Cooperative Sensing Messages (CSMs), thereby conserving and effectively using the available bandwidth.

In one aspect of the present disclosure, the method includes: detecting objects includes receiving remote-object data, the remote-object data includes class data and location data, the objects include remote vehicles and remote infrastructure In addition to receiving CSMs, the host vehicle also detects objects using its own sensors (i.e., local sensors). The method further includes assigning, by the controller, an object class to each of the detected objects based on the class data; assigning, by the controller, a priority value to each of the detected objects based on the object class of each of the detected objects; and assigning, by the controller, a transmission time interval (TTI) to the CSMs based on the priority value to modify the TTI of each of the CSMs in accordance with the assigned TTI, and transmitting the CSMs to, for example, remote vehicles.

The object class may include a vulnerable road user (VRU) class, a vehicle class, a traffic sign class, and an other class. The vehicle class may designate remote vehicles. The VRU class may designate pedestrians and cyclists. The traffic sign class may designate traffic signs and traffic symbols.

Assigning, by the controller, the object class to each of the detected objects based on the class data includes assigning the VRU class to at least one of the remote objects in response to detecting objects to indicate that the at least one of the remote objects is a VRU. Assigning, by the controller, the priority value to each of the detected objects based on the object class of each of the detected objects may include assigning a VRU priority value in response to assigning the VRU class to at least one of the remote objects; determining that the VRU is moving based on the location data; increasing the VRU priority value by a first, predetermined VRU value in response to determining that the VRU is moving; determining that the VRU is on a crosswalk based on the location data; increasing the VRU priority value by a second, predetermined VRU value in response to determining that the VRU is on the crosswalk; and a change in the VRU priority value is equal to a sum of the first, predetermined VRU value and the second, predetermined VRU value. Assigning, by the controller, the priority value to each of the detected objects based on the object class of each of the detected objects includes: assigning a VRU priority value in response to assigning the VRU class to at least one of the remote objects; determining that the VRU is moving based on the location data; increasing the VRU priority value by a first, predetermined VRU value in response to determining that the VRU is moving; and determining that the VRU is on a road based on the location data; and increasing the VRU priority value by a third, predetermined VRU value in response to determining that the VRU is on the road. A change in the VRU priority value is equal to a sum of the first, predetermined VRU value and the third, predetermined VRU value.

Assigning, by the controller, the TTI to the CSMs of each of the detected objects includes: assigning a default VRU TTI to the CSMs indicating that at least one of the detected object is the VRU; and modifying the default VRU TTI in a way that is proportional to the change in the VRU priority value.

The method of claim 2, wherein assigning, by the controller, the object class to each of the detected objects based on the class data may include: assigning the vehicle class to least one of the remote objects in response to detecting the objects to indicate that the at least one of the remote objects is a vehicle.

Assigning, by the controller, the priority value to each of the detected objects based on the object class of each of the detected objects may include: assigning a vehicle priority value in response to assigning the vehicle class to at least one of the remote objects; determining that the remote vehicle is an emergency vehicle; increasing the vehicle priority value by a first, predetermined-vehicle value in response to determining that the vehicle is the emergency vehicle; determining that a speed of the remote vehicle is greater than a predetermined speed threshold based on the remote-object-data; increasing the vehicle priority value by a second, predetermined-vehicle value in response to determining that the speed of the emergency vehicle is greater than the predetermined speed threshold; determining that the remote vehicle is performing a dangerous maneuver based on the object data, and the dangerous maneuver is selected from a group consisting of braking, lane change, and wheel slip; and increasing the vehicle priority value by a third, predetermined-vehicle value to the vehicle priority value in response to determining that the vehicle is performing a dangerous maneuver. The emergency vehicle may be a police car, an ambulance, and a fire truck.

Assigning, by the controller, the TTI to the CSMs of each of the detected objects may include assigning a default vehicle TTI to the CSMs indicating that at least one of the detected objects is the vehicle and modifying the default vehicle TTI in a way that is proportional to a change in the vehicle priority value. The change in the vehicle priority value is equal to a sum of the first, predetermined-vehicle value, second, predetermined-vehicle value and the third, predetermined-vehicle value.

Assigning, by the controller, the priority value to each of the detected objects based on the object class of each of the detected objects may include: assigning a vehicle priority value in response to assigning the vehicle class to at least one of the remote objects; determining that the vehicle is stationary based on the remote-object-data; and decreasing the vehicle priority value by a fourth, predetermined-vehicle increment to the priority value in response to determining that the vehicle is stationary. Assigning, by the controller, the TTI to the CSMs of each of the detected objects may include assigning a default vehicle TTI to the CSMs indicating that the at least one of the remote objects is the vehicle; and modifying the default vehicle TTI in a way that is proportional to the change in the vehicle priority value.

Assigning, by the controller, the object class to each of the detected objects based on the class data includes: assigning the traffic sign class to least one of the remote objects in response to detecting the objects to indicate that the at least one of the remote objects is a traffic sign.

Assigning, by the controller, the priority value to each of the detected objects based on the object class of each of the detected objects includes: assigning a sign priority value in response to assigning the traffic sign class to at least one of the remote objects in response to detecting the objects; determining that the traffic sign is dynamic; and increasing the sign priority value by a predetermined sign value in response to determining that the traffic sign is dynamic.

Assigning, by the controller, the TTI to the CSMs of each of the detected objects may include: assigning a default sign TTI to the CSMs indicating that at least one of the detected objects is the traffic sign; and modifying the default sign TTI in a way that is proportional to a change in the sign priority value.

Assigning, by the controller, the object class to each of the detected objects based on the class data may include: assigning the other class to least one of the remote objects in response to detecting the objects to indicate that the at least one of the remote objects is an other object.

Assigning, by the controller, the priority value to each of the detected objects based on the object class of each of the detected objects may include: assigning an other-priority value in response to assigning the other class to at least one of the remote objects in response to detecting the objects; determining that the other object is a dangerous condition, the dangerous condition being selected from a group consisting of a traffic accident, a weather condition that affects visibility, and a road condition that affects slippage of the host vehicle; and increasing the other priority value by a predetermined other value in response to determining that the other object is the dangerous condition.

Assigning, by the controller, the TTI to the CSMs of each of the detected objects may include: assigning a default other TTI to the CSMs indicating that the at least one remote object is the other object; and modifying the default other TTI in a way that is proportional to a change in the other priority value. The change in the other priority value is equal to the predetermined other value.

In one aspect of the present disclosure, the host vehicle includes a communication system and a controller in electric communication with the communication system. The controller is programmed to: detect objects, wherein detecting objects includes receiving remote-object data, the remote-object data includes class data and location data, the objects include remote vehicles and remote infrastructure; assign an object class to each of the detected objects based on the class data; assign a priority value to each of the detected objects based on the object class of each of the detected objects; and assign a transmission time interval (TTI) to the CSMs based on the priority value to modify the TTI of each of the CSMs in accordance with the assigned TTI; and transmit the CSMs to, for example, remove vehicles.

The object class may include a vulnerable road user (VRU) class, a vehicle class, a traffic sign class, and other classes. The vehicle class may designate remote vehicles. The VRU class may designate pedestrians and cyclists. The traffic sign class may designates traffic signs and traffic symbols. The controller may be further programmed to assign the object class to each of the detected objects based on the class data by assigning the VRU class to least one of the remote objects in response to detecting the objects to indicate that the at least one of the remote objects is a VRU. The controller may be programmed to assign the priority value to each of the detected objects based on the object class of each of the detected objects by: assigning a VRU priority value in response to assigning the VRU class to at least one of the remote objects; determining that the VRU is moving based on the location data; increasing the VRU priority value by a first, predetermined VRU value in response to determining that the VRU is moving; determining that the VRU is on a crosswalk based on the location data; and increasing the VRU priority value by a second, predetermined VRU value in response to determining that the VRU is on the crosswalk. A change in the VRU priority value is equal to a sum of the first, predetermined VRU value and the second, predetermined VRU value.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

The following detailed description is merely exemplary in nature and is not intended to limit the application and uses. Furthermore, there is no intention to be bound by a expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
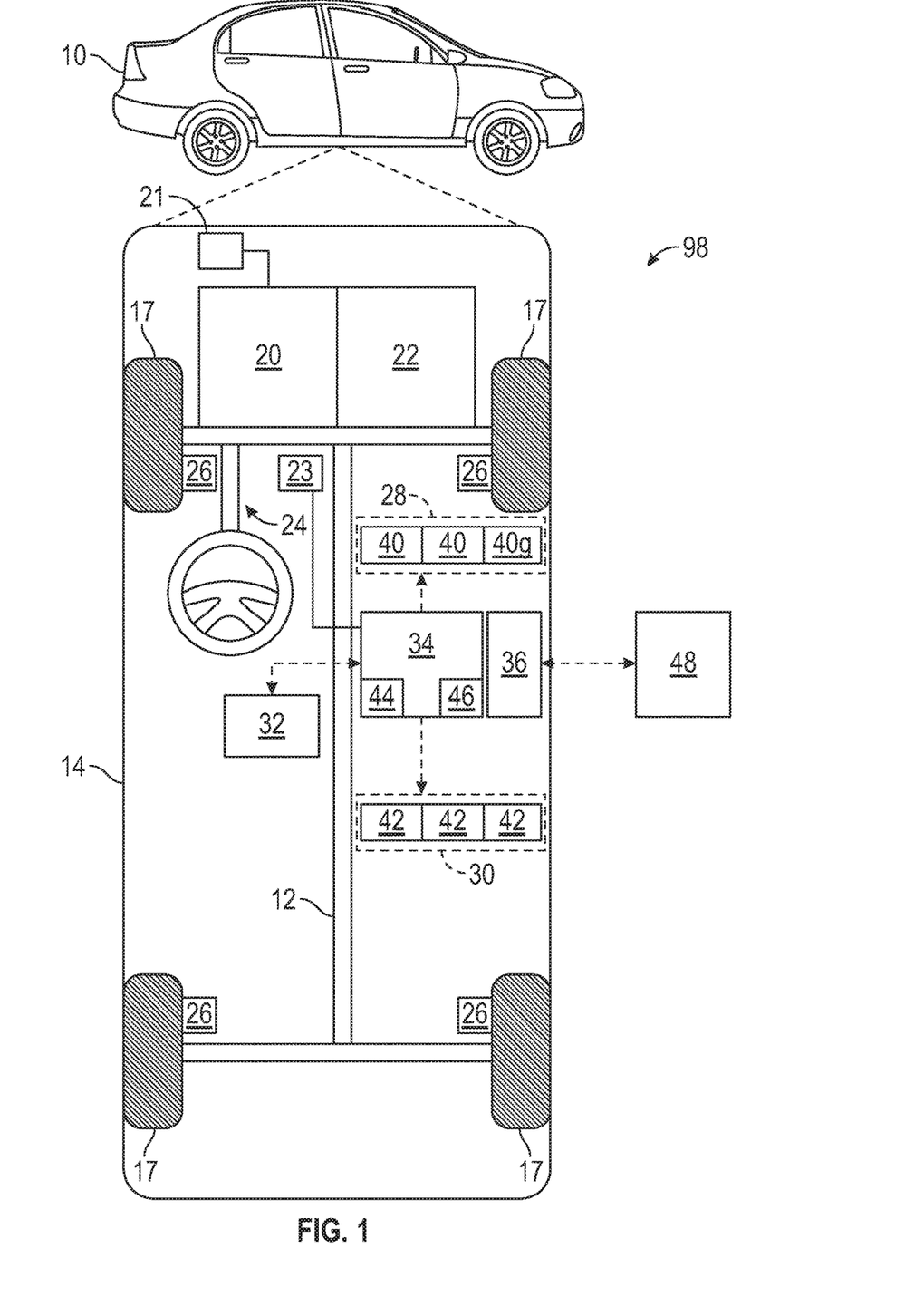
FIG. 1 is a schematic block diagram of a vehicle.

As depicted in FIG. 1, the vehicle 10 generally includes a chassis 12, a body 14, front and rear wheels 17 and may be referred to as the host vehicle. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle and a control system 98 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that other vehicles including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of the aspects of the dynamic driving task, even if a human driver does not respond appropriately to a request to intervene. A Level Five system indicates "full automation", referring to the full-time performance by an automated driving system of the aspects of the dynamic driving task under roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensing devices 40 (i.e., sensors) that sense observable conditions of the exterior environment and/or the interior environment of the vehicle 10. The sensing devices 40 may include, but are not limited to, radars, lidars, global positioning systems, optical cameras, thermal cameras, ultrasonic sensors, and/or other sensors. The actuator system 30 includes one or more actuator devices 42 that control one or more vehicle features such as, but not limited to, the propulsion system 20, the transmission system 22, the steering system 28, and the brake system 26. In various embodiments, the vehicle features can further include interior and/or exterior vehicle features such as, but are not limited to, doors, a trunk, and cabin features such as air, music, lighting, etc. (not numbered). The sensing system 24 includes one or more Global Positioning System (GPS) transceiver 40g configured to detect and monitor the route data (i.e., route information). The GPS transceiver 40g is configured to communicate with a GPS to locate the position of the vehicle 10 in the globe. The GPS transceiver 40g is in electronic communication with the controller 34.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured to receive inputs from the user via the user interface 23. The user interface 23 includes a display configured to display information to the user (e.g., vehicle operator or passenger).

Figure 2:
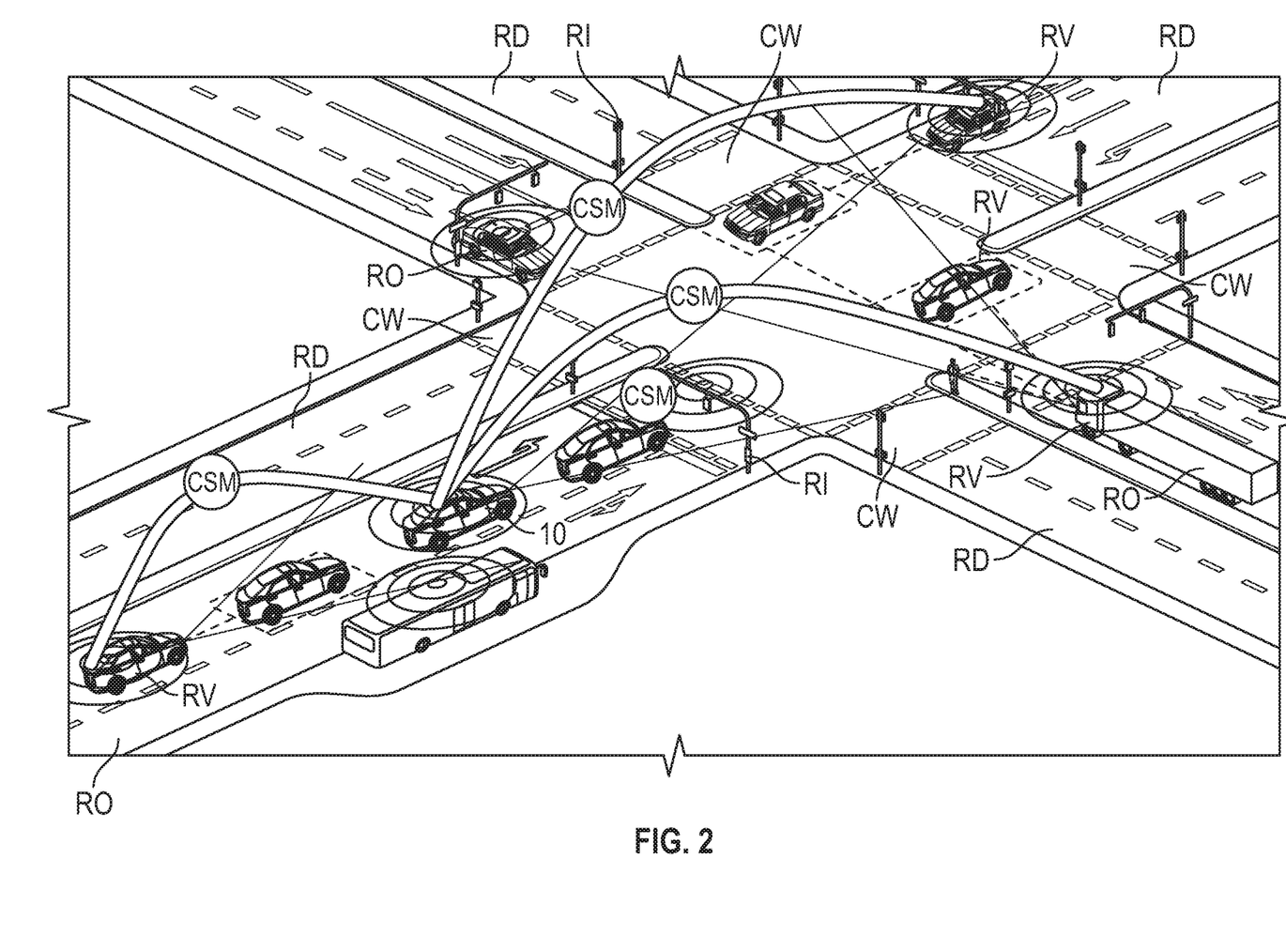
FIG. 2 is a schematic diagram of a vehicle receiving from and transmitting CSMs to remote objects.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 is a schematic block diagram of the control system 98, which is configured to control the vehicle 10. The controller 34 of the control system 98 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include internal combustion engine and, in that case, the propulsion actuator may be a throttle specially configured to control the airflow in the internal combustion engine. The sensor system 28 may include one or more accelerometers (or one or more gyroscopes) coupled to one or more wheel 17. The accelerometer is in electronic communication with the controller 34 and is configured to measure and monitor the longitudinal and lateral accelerations of the vehicle 10. The sensor system 28 may include one or more speed sensors configured to measure the speed (or velocity) of the vehicle 10. The speed sensor is coupled to the controller 34 and is in electronic communication with one or more wheels 17.

With reference to FIG. 2, the communication system 36 allows the vehicle 10 (i.e., the host vehicle) to receive and/or transmit CSMs to sense remote objects RO, such as the remote vehicles RV, remote infrastructure RI, and/or vulnerable road users (VRUs). The remote infrastructure RI may include traffic symbols and/or traffic signs (e.g., a stop sign, a traffic light, etc.). The remote vehicles RV may sense other remote vehicles and/or remote infrastructure, such as traffic signs, using its sensors (i.e., optical cameras). The remote objects, such as the remote vehicles RV or the remote infrastructure RI, send the CSMs to the vehicle 10. The CSMs may include remote-object-data. The remote-object-data may include, among other things, class data and location data. The location data is indicative of the location (in real time) of the detected object RO. Because the location of the detected object (e.g., remote vehicle RV) is monitored in real time, the controller 34 is programmed to determine the speed of the detected object. A remote vehicle RV may include all the components of the vehicle 10 (i.e., host vehicle), such as the communication system 36 and the sensor system 28. The class data is indicative of the object class of the detected object. The object class includes a vulnerable road user (VRU) class, a vehicle class, a traffic sign class, and other classes. The vehicle class may designate vehicles (i.e., remote vehicles RV). The VRU class designates, among other things, pedestrians and cyclists. The traffic sign class designates traffic signs and traffic symbols. The other class designates other sensed objects or conditions, such as weather conditions (e.g., fog, rain, snow) and/or road conditions (e.g., traffic accidents, wet roads, etc.)

Figure 3:
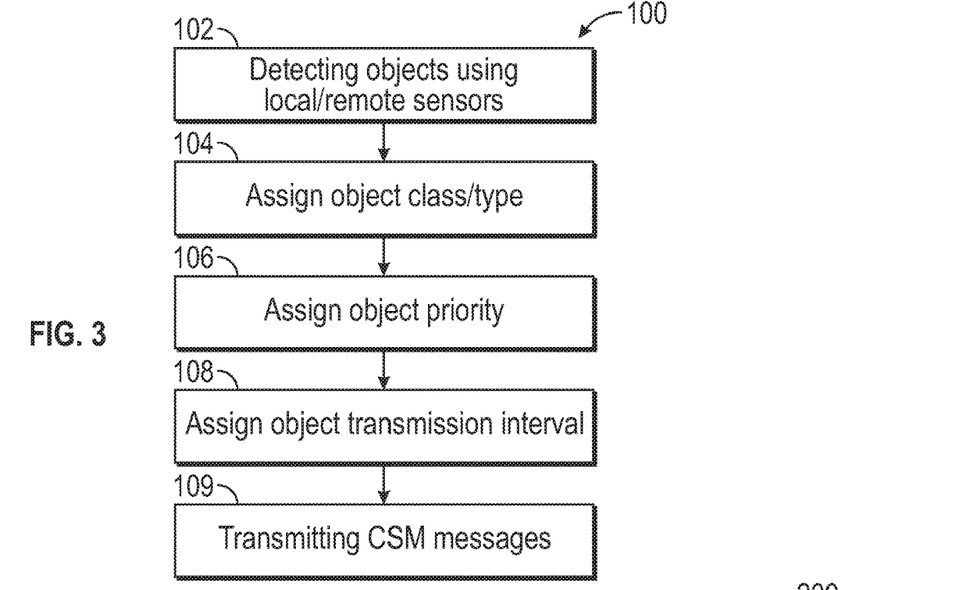
FIG. 3 is a flowchart of a method for controlling the vehicle of FIG. 1.

FIG. 3 is a flowchart of a method 100 to prioritize sensed objects for cooperative sensor sharing. In cooperative sensor sharing, the remote vehicles RV and/or remote infrastructure RI share sensed data about sensed objects (including themselves) with a host vehicle (i.e., the vehicle 10). Cooperative sensor sharing wireless transmission of sensor information to neighboring users (other vehicles) for cooperative information, which is bandwidth intensive. By employing this method 100, the sensed data is prioritized based on the sensed object type/class, location, and other parameters to optimize the transmission time interval (TTI) of the CSMs, thereby conserving and effectively using the available bandwidth. The term "TTI" means the duration of a transmission on a radio link. The term "radio link" means a wireless connection between two or more nodes, or radio units, in a data network. Modifying the TTI of a CSM results in a modification of the frequency of the CSMs. A large number of remote objects could be detected by the sensor system 28 of the vehicle 10 (and the remote vehicles RV). Some remote objects are high importance, such as fast-moving vehicles, emergency vehicles, etc. Other remote objects are of lower importance, such as parked vehicles, etc. Transmitting sensed data about the remote objects is bandwidth intensive. The method 100 conserves bandwidth by varying the transmission time interval based on object priority. CSMs about higher priority objects are transmitted more frequently, whereas CSMs about lower priority objects are transmitted less frequently.

The method 100 begins at block 102. At block 102, the controller 34 detects objects (i.e., remote objects RO, such as other vehicles or pedestrians) around the host vehicle 10 using its own local sensors (i.e., sensing devices 40) and remote sensors (i.e., sensors from the remote objects RO). The local sensors (i.e., sensing devices 40) locally equipped on the vehicle 10 can be used to detect objects around the vehicle 10. The local sensors may include, but are not limited to, lidar, camera, and radar. Also, the remote sensors can be similar to or the same as the local sensors (i.e., sensing devices 40), but they are not located on the host vehicle 10. For example, the remote sensors can be located on a different vehicle (i.e., a remote vehicle RV). The readings from the remote sensors can be shared with the host vehicle 10 via a wireless communication. In other words, block 102 entails detecting, by a controller of the host vehicle, objects. Detecting objects includes receiving remote-object data. The remote-object data includes class data and location data. The objects include remote vehicles and remote infrastructure. Block 102 may also entails receiving, by the controller 34 of the vehicle 10, CSMs to sense remote objects RO. As discussed above, the remote objects (or objects) include remote vehicles RV and remote infrastructure RI. The remote objects send the CSMs to the vehicle 10. The CSMs include remote-object-data, and the remote-object-data includes class data and location data. Then, the method 100 proceeds at block 104. At block 104, the controller 34 assigns, an object class to each of the detected objects based on the class data. Then, the method 100 proceeds to block 106. At block 106, the controller 34 assigns a priority value to each of the detected objects based on the object class of each of the detected objects. Then, the method 100 proceeds to block 108. At block 108, the controller 34 assigns a transmission time interval (TTI) to the CSMs of each of the detected objects. Each of the assigned TTIs of the CSMs of each of the detected objects is proportional to the object priority of each of the detected objects to converse bandwidth. Block 108 also entails modifying the TTIs of each of the CSMs in accordance with the assigned TTIs. Then, the method proceeds to block 109. Block 109 entails transmitting the CSMs to, for example, remote vehicles RV in accordance with the modified TTIs. In other words, in block 109, the vehicle 10 wirelessly transmits the CSMs, using one or more antennas and/or transceivers, to other objects, such as remote vehicles RV and/or remote infrastructure RI.

Figure 4:
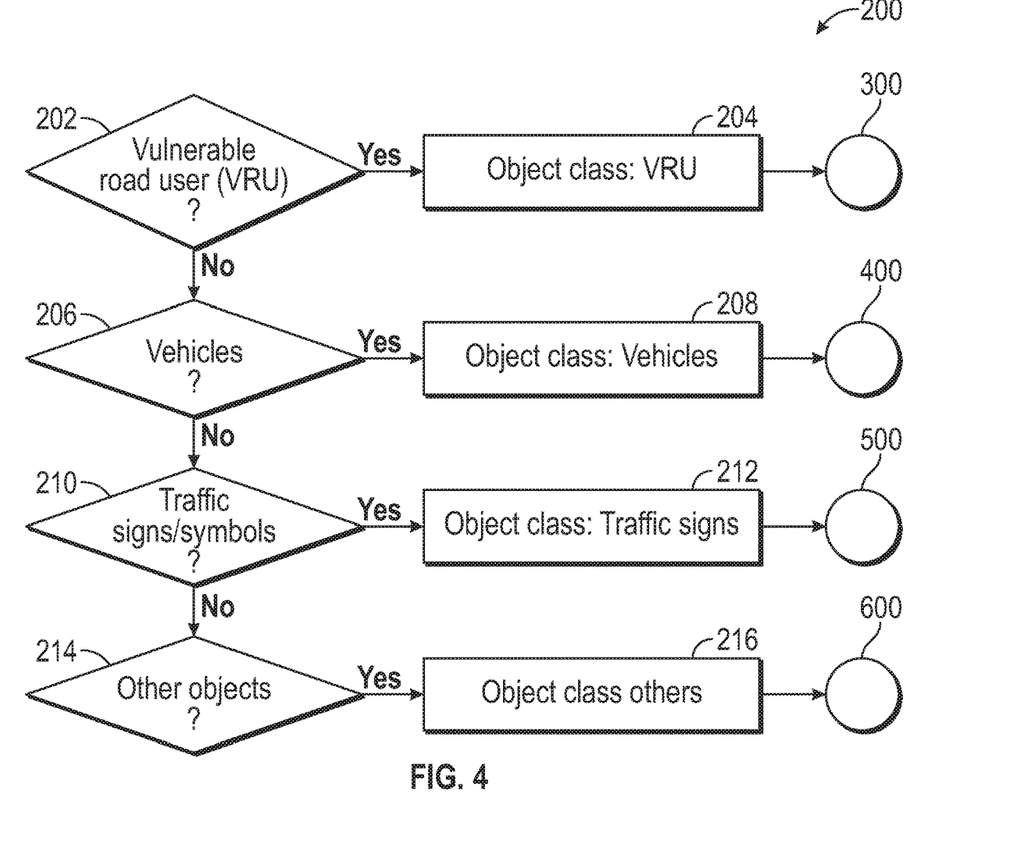
FIG. 4 is a flowchart of a subroutine for assigning an object class to each of the detected objects.

FIG. 4 is flowchart of a subroutine 200 executing block 106 of FIG. 3. In other words, FIG. 3 is a flowchart of a subroutine 200 for assigning an object class to each of the remote objects. The subroutine 200 begins at block 202. At block 202, the controller 34 determines whether any of the remote objects sensed (or detected) based on the CSMs is a VRU. VRUs include, but are not limited to, pedestrians, cyclists, road workers, or other humans that are not inside of a vehicle or building. If the controller 34 senses one or more VRUs based on the object data in the CSMs, then the subroutine 200 proceeds to block 204. As discussed above, the CSMs include object data. The object data may in turn include object class information (i.e., data about the class of the detected object). At block 204, the controller 34 assigns the VRU class to least one of the detected objects in response to detecting the objects to indicate that the at least one of the remote objects is a VRU. Then, after executing block 202, the subroutine 200 executes a subroutine 300 as discussed below with respect to FIG. 4.

With continued reference to FIG. 4, if the controller 34 does not sense one or more VRUs based on the object data in the CSMs, then the subroutine 200 proceeds to block 206. At block 206, the controller 34 determines whether any of the remote object sensed (or detected) based on the CSMs is a remote vehicle RV. The remote vehicles include trucks, cars, motorcycles, autonomous vehicle, manually-operated vehicle, etc. If the controller 34 senses one or more remote vehicle RV based on the object data in the CSMs, then the subroutine 200 proceeds to block 208. At block 208, the controller 34 assigns the vehicle class to least one of the detected objects in response to detecting the objects to indicate that the at least one of the remote objects is a vehicle. Then, after executing block 206, the subroutine 200 executes a subroutine 400 as discussed below with respect to FIG. 5.

With continued reference to FIG. 4, if the controller 34 does not sense one or more remote vehicles RV based on the object data in the CSMs, then the subroutine 200 proceeds to block 210. At block 210, the controller 34 determines whether any of the remote objects sensed (or detected) based on the CSMs is a traffic sign (and/or a traffic symbol). In the present disclosure, the term "traffic sign" includes a traffic symbol. The traffic sign may be static, such as a stop sign, or dynamic, such as a traffic light. If the controller 34 senses one or more remote traffic signs based on the object data in the CSMs, then the subroutine 200 proceeds to block 212. At block 212, the controller 34 assigns the sign class to least one of the detected objects in response to detecting the objects to indicate that the at least one of the remote objects is a traffic sign. Then, after executing block 212, the subroutine 200 executes a subroutine 500 as discussed below with respect to FIG. 6.

With continued reference to FIG. 4, if the controller 34 does not sense one or more traffic signs based on the object data in the CSMs, then the subroutine 200 proceeds to block 214. At block 214, the controller 34 determines whether any of the remote objects sensed (or detected) based on the CSMs is another object (excluding VRUs, vehicles, and traffic signs). In the present disclosure, the term "another object" or "other object" refers to a remote object that is not a vehicle, a VRU, or a traffic sign. If the controller 34 senses one or more remote other objects based on the object data in the CSMs, then the subroutine 200 proceeds to block 216. At block 216, the controller 34 assigns the other class to least one of the detected objects in response to detecting the objects to indicate that the at least one of the remote objects is another object. Then, after executing block 216, the subroutine 200 executes a subroutine 600 as discussed below with respect to FIG. 7.

Figure 5:
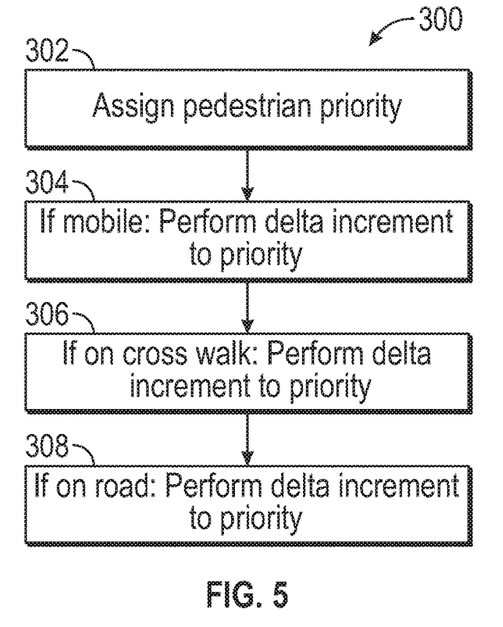
FIG. 5 is a flowchart of a subroutine for assigning object priority to VRUs.

FIG. 5 is a flowchart of a subroutine 300 for assigning object priority to VRUs. The subroutine 300 begins at block 302. At block 302, the controller 34 assigns a VRU priority value in response to assigning the VRU class to least one of the remote objects RO. Then, the subroutine 300 continues to block 304. At block 304, the controller 34 determines whether the VRU is moving based on the location data in the CSM. If the VRU is moving, then the controller 34 increases the VRU priority value by a first, predetermined VRU value. In other words, the controller 34 adds the first, predetermined VRU value to the VRU priority value. If the controller 34 determines that the VRU is not moving, then the controller 34 does not increase the VRU priority value by the first, predetermined VRU value. Then, the subroutine 300 continues to block 306.

At block 306, the controller 34 determines whether the VRU (e.g., pedestrian) is on a crosswalk CW (see FIG. 2) based on the location data in the CSM. The term "crosswalk" means an area distinctly indicated for pedestrian crossing or other pavement marking. If the VRU is located on the crosswalk CW, then the controller 34 increases the VRU priority value by a second, predetermined VRU value. In other words, the controller 34 adds the second, predetermined VRU value to the VRU priority value. It is important to note that, at block 306, the controller 34 may add the second, predetermined VRU value to the sum of the VRU priority value and the first, predetermined VRU value if the VRU is moving as determined in block 304. If the VRU is not located on the crosswalk CW, then the controller 34 does not add the second, predetermined VRU value to the VRU priority value. Then, the subroutine 300 continues to block 308.

At block 308, the controller 34 determines whether the VRU is on a road RD (FIG. 2) based on location data. The VRU (e.g., pedestrian) is located on a road if it is not on a sidewalk or crosswalk. The term "sidewalk" means a path that is along the side of a road. If the VRU is located on the road RD, then the controller 34 increases the VRU priority value by a third, predetermined VRU value. In other words, the controller 34 adds the second, predetermined VRU value to the VRU priority value. It is important to note that, at block 306, the controller 34 may add the third, predetermined VRU value to the sum of the VRU priority value and the first, predetermined VRU value if the VRU is moving as determined in block 304. The third, predetermined VRU value is greater than the second, predetermined VRU value to indicate a higher priority than if the VRU is on the road RD (instead of the crosswalk CW). If the VRU is not located on the road RD, then the controller 34 does not increase the VRU priority value by the third, predetermined VRU value. Depending on the conditions determined above, the change in the VRU priority value may be: (a) the sum of the first, predetermined VRU value, the second, predetermined VRU value, and third, predetermined VRU value; (b) the sum of the first, predetermined VRU value and third, predetermined VRU value; (c) the sum of the first, predetermined VRU value and the second, predetermined VRU value; or (d) the individual values of the first, predetermined VRU value, the second, predetermined VRU value, or third, predetermined VRU value.

Figure 6:
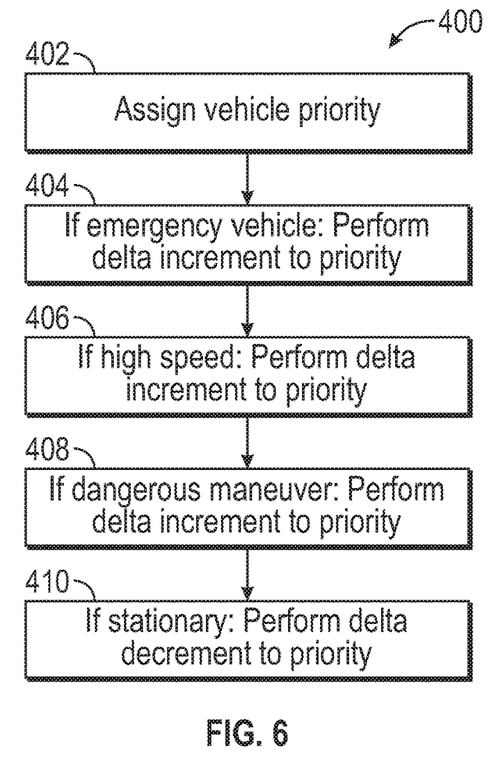
FIG. 6 is a flowchart of a subroutine for assigning object priority to vehicles.

FIG. 6 is a flowchart of a subroutine 400 for assigning object priority to remote vehicles RV. The subroutine 400 begins at block 402. At block 402, the controller 34 assigns a vehicle priority value in response to assigning the remote vehicle class to at least one of the remote objects RO. Then, the subroutine 400 proceeds to block 404. At block 404, the controller 34 determines whether the remote vehicle RV is an emergency vehicle based on the remote-object-data. The remote-object-data may include information about the sensed remote vehicle RV, such as whether the remote vehicle RV is an emergency vehicle. The emergency vehicle may be, for example, a police car, an ambulance, and/or a fire truck. If the remote vehicle RV is an emergency vehicle, then the controller 34 increases the vehicle priority value by a first, predetermined vehicle value in response to determining that the vehicle is the emergency vehicle. In other words, the controller 34 adds the first, predetermined vehicle value to the priority value. If the controller 34 does not determine that the remote vehicle RV is an emergency vehicle, then the controller 34 does not add the first, predetermined vehicle value to the vehicle priority value. Then, the subroutine 400 proceeds to block 406.

At block 406, the controller 34 determines whether the speed of the sensed remote vehicle RV is greater than a predetermined speed threshold based on the remote-object-data. In other words, at block 406, the controller 34 determines whether the sensed remote vehicle is traveling at a high speed. The remote-object-data may include speed data about the remote object RO (e.g., the remote vehicle RV). If the speed of the sensed remote vehicle RV is greater than the predetermined speed threshold, then the controller 34 increases the vehicle priority value by a second, predetermined vehicle value to the vehicle priority value. In other words, the controller 34 adds the second, predetermined vehicle value to the vehicle priority value. It is important to note that, at block 406, the controller 34 may add the second, predetermined vehicle value to the sum of the vehicle priority value and the first, predetermined vehicle value if the sensed remote vehicle RV is an emergency vehicle. If the speed of the sensed remote vehicle RV is not greater than the predetermined speed threshold, then the controller 34 does not add the second, predetermined vehicle value to the vehicle priority value. Then, the subroutine 400 proceeds to block 408.

At block 408, the controller 34 determines whether the sensed remote vehicle RV is performing a dangerous maneuver based on the object data. The dangerous maneuver may be braking, lane change, and/or wheel slip based on the remote-object-data. If the sensed remote vehicle RV is performing the dangerous maneuver, then the controller 34 increases the vehicle priority value by a third, predetermined vehicle value to the vehicle priority value. In other words, the controller 34 adds the third, predetermined vehicle value to the vehicle priority data. It is important to note that, at block 408, the controller 34 may add the third, predetermined vehicle value to the sum of the vehicle priority value, the first, predetermined vehicle value, and the second, predetermined vehicle value if the sensed remote vehicle RV is an emergency vehicle and the speed of the sensed remote vehicle RV is greater than the predetermined speed threshold. If the sensed remote vehicle RV is not performing a dangerous maneuver, then the controller 34 does not add the third, predetermined vehicle value to the vehicle priority value. Then, the subroutine 400 continues to block 410.

Figure 12:
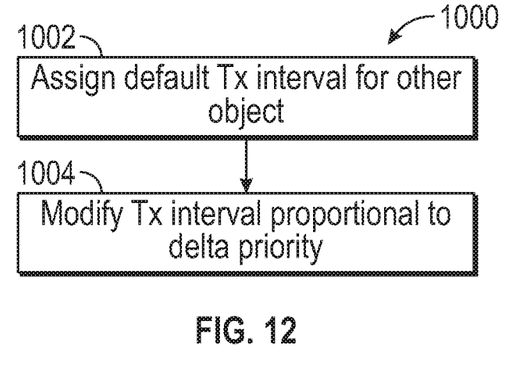
FIG. 12 is a subroutine for assigning a default other TTI

At block 410, the controller 34 determines whether the sensed remote vehicle RO is stationary determining that the vehicle is stationary based on the remote-object-data. If the sensed remote vehicle RV is stationary, then the controller 34 decreases the vehicle priority value by a fourth, predetermined vehicle value to the priority value. In other words, the controller 34 subtracts the fourth, predetermined vehicle value from the vehicle priority value. It is important to note the fourth, predetermined vehicle value may be subtracted from the vehicle priority value. It is important to note that FIG. 12 is a subroutine 1000 for assigning a default other TTI the fourth, predetermined vehicle value may be subtracted from the sum of the vehicle priority value and the first, predetermined vehicle value. If the sensed remote vehicle RV is not stationary, then the controller 34 does not subtract the fourth, predetermined vehicle value from the vehicle priority value. Depending on the conditions determined above, the change in the vehicle priority value may be: (a) the sum of the first, predetermined vehicle value, the second, predetermined vehicle value, and third, predetermined vehicle value; (b) the sum of the first, predetermined vehicle value and third, predetermined vehicle value; (c) the sum of the first, predetermined vehicle value and the second, predetermined vehicle value; or (d) the individual values of the first, predetermined vehicle value, the second, predetermined VRU value, third, predetermined vehicle value, or the fourth, predetermined vehicle value.

Figure 7:
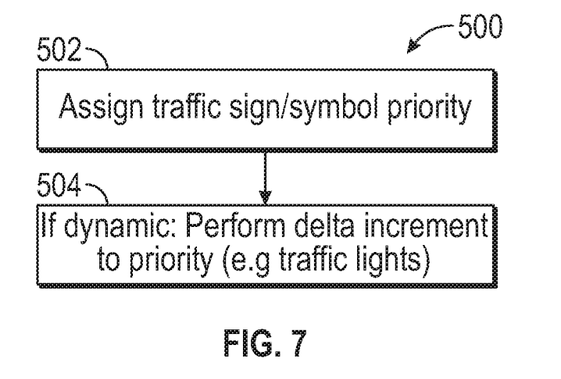
FIG. 7 is a flowchart of a subroutine for assigning object priority to traffic signs.

FIG. 7 is a flowchart of a subroutine 500 for assigning object priority to traffic sign. The subroutine 500 begins at block 502. At block 502, the controller 34 assigns a sign priority value in response to assigning the traffic sign class to at least one of the detected objects. Then, the subroutine 500 continues to block 504. At block 504, the controller 34 determines whether the traffic sign is dynamic, such as a traffic light. The controller 34 increases the sign priority value by a predetermined sign value in response to determining that the traffic sign is dynamic. In the present disclosure, the term "dynamic" means a traffic sign that changes over time, such as a traffic light.

Figure 8:
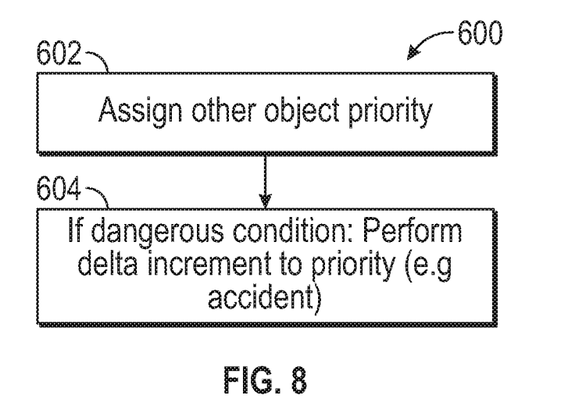
FIG. 8 is a flowchart of a subroutine for assigning object priority to other objects.

FIG. 8 is a flowchart of a subroutine 600 for assigning object priority to other objects. The subroutine 600 begins at block 602. At block 602, the controller 34 assigns an other-priority value in response to assigning the other class to at least one of the remote objects RO. Then, the subroutine 600 proceeds to block 604. At block 604, the controller 34 determines whether the other object is a dangerous condition. The dangerous condition may be a traffic accident, a weather condition that affects visibility, and a road condition that affects slippage of the host vehicle. If the other object is a dangerous condition, then the controller 34 increases the other priority value by a predetermined other value. In this case, the change in other priority value may be equal to the predetermined other value.

Figure 9:
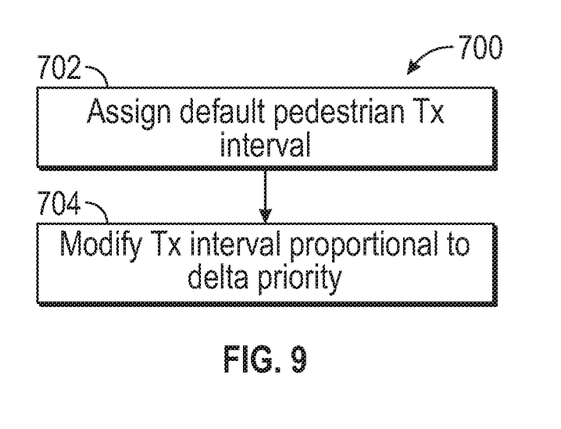
FIG. 9 is a flowchart of a subroutine for assigning VRU TTI.

FIG. 9 is a subroutine 700 for assigning VRU TTI (i.e., the TTI of the CSMs that sense VRUs.). The subroutine 700 begins at block 702. At block 702, the controller 34 assigns a default VRU TTI to the CSMs indicating that the at least one remote object is the VRU. Then, the subroutine 700 proceeds to block 704. At block 704, the controller 34 modifies the default VRU TTI in a way that is proportional to the change in the VRU priority value. The term "proportional" means having a constant ratio to another quantity. In this context, the VRU TTI has a constant ratio to the change in the VRU priority value.

Figure 10:
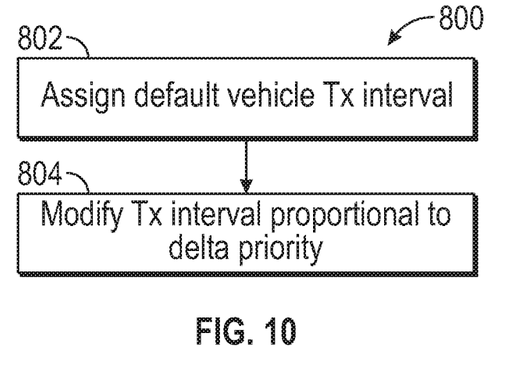
FIG. 10 is a subroutine for assigning vehicle TTI.

FIG. 10 is a subroutine 800 for assigning vehicle TTI (i.e., the TTI of the CSMs that sense remote vehicles RV). The subroutine 800 begins at block 802. At block 802, the controller 34 assigns a default vehicle TTI to the CSMs indicating that the at least one remote object is the remote vehicle RV. Then, the subroutine 800 proceeds to block 804. At block 804, the controller 34 modifies the default vehicle TTI in a way that is proportional to the change in the vehicle priority value. In this context, the vehicle TTI has a constant ratio to the change in the vehicle priority value.

Figure 11:
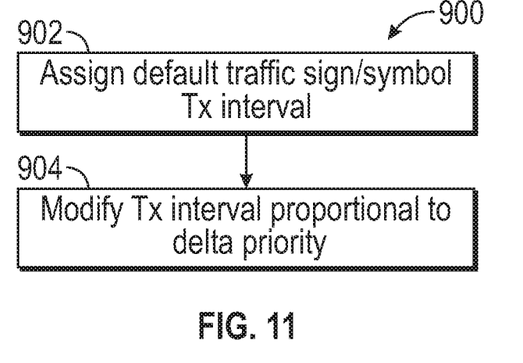
FIG. 11 is a subroutine for assigning vehicle TTI.

FIG. 11 is a subroutine 900 for assigning vehicle TTI (i.e., the TTI of the CSMs that sense remote vehicles RV). The subroutine 900 begins at block 902. At block 802, the controller 34 assigns a default sign TTI to the CSMs indicating that at least one remote object is a traffic symbol. Then, the subroutine 900 proceeds to block 904. At block 904, the controller 34 modifies the default sign TTI in a way that is proportional to the change in the sign priority value. In this context, the sign TTI has a constant ratio to the change in the sign priority value. The change in the sign priority value may be equal to the predetermined sign value.

FIG. 12 is a subroutine 1000 for assigning a default other TTI (i.e., the TTI of the CSMs that sense other object). The subroutine 1000 begins at block 1002. At block 1002, the controller 34 assigns a default other TTI to the CSMs indicating that at least one remote object is a traffic symbol. Then, the subroutine 1000 proceeds to block 1004. At block 1004, the controller 34 modifies the default sign TTI in a way that is proportional to the change in the other priority value. In this context, the sign TTI has a constant ratio to the change in the other priority value. The change in the other priority value may be equal to the predetermined other value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method to control a host vehicle, comprising:
   detecting, by a controller of the host vehicle, objects, wherein detecting objects includes receiving remote-object data, the remote-object data includes class data and location data, the objects include first remote vehicles and remote infrastructure;
   assigning, by the controller, an object class to each of the detected objects based on the class data;
   assigning, by the controller, a priority value to each of the detected objects based on the object class of each of the detected objects;
   assigning, by the controller, a transmission time interval (TTI) to cooperative sensing messages CSMs based on the priority value to modify the TTI of each of the CSMs in accordance with the assigned TTI; and
   transmitting the CSMs to second remote vehicles.

2. The method of claim 1, wherein:
   the object class includes a vulnerable road user (VRU) class, a vehicle class, a traffic sign class, and an other class;
   the vehicle class designates remote vehicles;
   the VRU class designates pedestrians and cyclists; and
   the traffic sign class designates traffic signs and traffic symbols.

3. The method of claim 2, wherein assigning, by the controller, the object class to each of the detected objects based on the class data includes:
   assigning the VRU class to least one of the remote objects in response to detecting the objects to indicate that the at least one of the remote objects is a VRU.

4. The method of claim 3, wherein assigning, by the controller, the priority value to each of the detected objects based on the object class of each of the detected objects includes:
   assigning a VRU priority value in response to assigning the VRU class to the at least one of the remote objects;
   determining that the VRU is moving based on the location data;
   increasing the VRU priority value by a first, predetermined VRU value in response to determining that the VRU is moving;
   determining that the VRU is on a crosswalk based on the location data;
   increasing the VRU priority value by a second, predetermined VRU value in response to determining that the VRU is on the crosswalk; and
   wherein a change in the VRU priority value is equal to a sum of the first, predetermined VRU value and the second, predetermined VRU value.

5. The method of claim 3, wherein assigning, by the controller, the priority value to each of the detected objects based on the object class of each of the detected objects includes:
   assigning a VRU priority value in response to assigning the VRU class to the at least one of the remote objects;
   determining that the VRU is moving based on the location data;
   increasing the VRU priority value by a first, predetermined VRU value in response to determining that the VRU is moving;
   determining that the VRU is on a road based on the location data; and increasing the VRU priority value by a third, predetermined VRU value in response to determining that the VRU is on the road; and wherein a change in the VRU priority value is equal to a sum of the first, predetermined VRU value and the third, predetermined VRU value.

6. The method of claim 5, wherein assigning, by the controller, the TTI to the CSMs of each of the detected objects includes:

assigning a default VRU TTI to the CSMs indicating that at least one of the detected object is the VRU; and modifying the default VRU TTI in a way that is proportional to the change in the VRU priority value.

7. The method of claim 2, wherein assigning, by the controller, the object class to each of the detected objects based on the class data includes:

assigning the vehicle class to least one of the remote objects in response to detecting the objects to indicate that the at least one of the remote objects is a vehicle.

8. The method of claim 2, wherein assigning, by the controller, the priority value to each of the detected objects based on the object class of each of the detected objects includes:

assigning a vehicle priority value in response to assigning the vehicle class to the at least one of the remote objects;

determining that at least one of the first remote vehicles is an emergency vehicle, and the emergency vehicle is selected from a group consisting of a police car, an ambulance, and a fire truck;

increasing the vehicle priority value by a first, predetermined-vehicle value in response to determining that the vehicle is the emergency vehicle;

determining that a speed of the first remote vehicle is greater than a predetermined speed threshold based on the remote-object-data;

increasing the vehicle priority value by a second, predetermined-vehicle value in response to determining that the speed of the emergency vehicle is greater than the predetermined speed threshold;

determining that at least one of the first remote vehicles is performing a dangerous maneuver based on the object data, and the dangerous maneuver is selected from a group consisting of braking, lane change, and wheel slip; and increasing the vehicle priority value by a third, predetermined-vehicle value to the vehicle priority value in response to determining that the vehicle is performing a dangerous maneuver.

9. The method of claim 8, wherein assigning, by the controller, the TTI to the CSMs of each of the detected objects includes:

assigning a default vehicle TTI to the CSMs indicating that at least one of the detected objects is the vehicle;

modifying the default vehicle TTI in a way that is proportional to a change in the vehicle priority value; and the change in the vehicle priority value is equal to a sum of the first, predetermined-vehicle value, second, predetermined-vehicle value and the third, predetermined-vehicle value.

10. The method of claim 7, wherein:

assigning, by the controller, the priority value to each of the detected objects based on the object class of each of the detected objects includes:

assigning a vehicle priority value in response to assigning the vehicle class to the at least one of the remote objects;

determining that the vehicle is stationary based on the remote-object-data;

decreasing the vehicle priority value by a fourth, predetermined-vehicle increment to the priority value in response to determining that the vehicle is stationary; and assigning, by the controller, the TTI to the CSMs of each of the detected objects includes:

assigning a default vehicle TTI to the CSMs indicating that the at least one remote object is the vehicle; and modifying the default vehicle TTI in a way that is proportional to the change in the vehicle priority value.

11. The method of claim 2, wherein assigning, by the controller, the object class to each of the detected objects based on the class data includes:

assigning the traffic sign class to least one of the remote objects in response to detecting the objects to indicate that the at least one of the remote objects is a traffic sign.

12. The method of claim 10, wherein assigning, by the controller, the priority value to each of the detected objects based on the object class of each of the detected objects includes:

assigning a sign priority value in response to assigning the traffic sign class to the at least one of the remote objects in response to detecting the objects;

determining that the traffic sign is dynamic; and increasing the sign priority value by a predetermined sign value in response to determining that the traffic sign is dynamic.

13. The method of claim 12, wherein assigning, by the controller, the TTI to the CSMs of each of the detected objects includes:

assigning a default sign TTI to the CSMs indicating that at least one of the detected objects is the traffic sign; and modifying the default sign TTI in a way that is proportional to a change in the sign priority value.

14. The method of claim 2, wherein assigning, by the controller, the object class to each of the detected objects based on the class data includes:

assigning the other class to least one of the remote objects in response to detecting the objects to indicate that the at least one of the remote objects is an other object.

15. The method of claim 14, wherein assigning, by the controller, the priority value to each of the detected objects based on the object class of each of the detected objects includes:

assigning an other-priority value in response to assigning the other class to the at least one of the remote objects in response to detecting the objects;

determining that the other object is a dangerous condition, the dangerous condition being selected from a group consisting of a traffic accident, a weather condition that affects visibility, and a road condition that affects slippage of the host vehicle; and increasing the other priority value by a predetermined other value in response to determining that the other object is the dangerous condition.

16. The method of claim 15, wherein assigning, by the controller, the TTI to the CSMs of each of the detected objects includes:

assigning a default other TTI to the CSMs indicating that the at least one remote object is the other object; and modifying the default other TTI in a way that is proportional to a change in the other priority value; and wherein the change in the other priority value is equal to the predetermined other value.

17. A host vehicle, comprising:

a communication system;

a controller in electric communication with the communication system, wherein the controller is programmed to:

detect objects, wherein detecting objects includes receiving remote-object data, the remote-object data includes class data and location data, the objects include first remote vehicles and remote infrastructure;

assign an object class to each of the detected objects based on the class data;

assign a priority value to each of the detected objects based on the object class of each of the detected objects; and assign a transmission time interval (TTI) to cooperative sensing messages CSMs based on the priority value to modify the TTI of each of the CSMs in accordance with the assigned TTI; and transmit the CSMs to second remote vehicles.

18. The host vehicle of claim 17, wherein:

the object class includes a vulnerable road user (VRU) class, a vehicle class, a traffic sign class, and an other class;

the vehicle class designates the first remote vehicles;

the VRU class designates pedestrians and cyclists; and the traffic sign class designates traffic signs and traffic symbols.

19. The host vehicle of claim 18, wherein the controller is programmed to assign the object class to each of the detected objects based on the class data by assigning the VRU class to least one of the remote objects in response to detecting the objects to indicate that the at least one of the remote objects is a VRU.

20. The host vehicle of claim 19, wherein the controller is programmed to assign the priority value to each of the detected objects based on the object class of each of the detected objects by:

assigning a VRU priority value in response to assigning the VRU class to the at least one of the remote objects;

determining that the VRU is moving based on the location data;

increasing the VRU priority value by a first, predetermined VRU value in response to determining that the VRU is moving;

determining that the VRU is on a crosswalk based on the location data;

increasing the VRU priority value by a second, predetermined VRU value in response to determining that the VRU is on the crosswalk; and     wherein a change in the VRU priority value is equal to a sum of the first, predetermined VRU value and the second, predetermined VRU value.

\* \* \* \* \*